C. S. LOCKWOOD.
MEANS FOR LOCKING A SLEEVE UPON A HUB OR SHAFT.
APPLICATION FILED JULY 11, 1918.
1,282,604.
Patented Oct. 22, 1918.
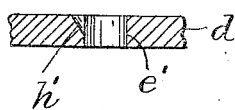
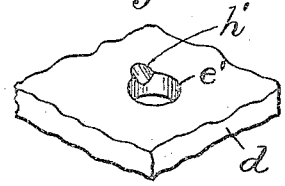
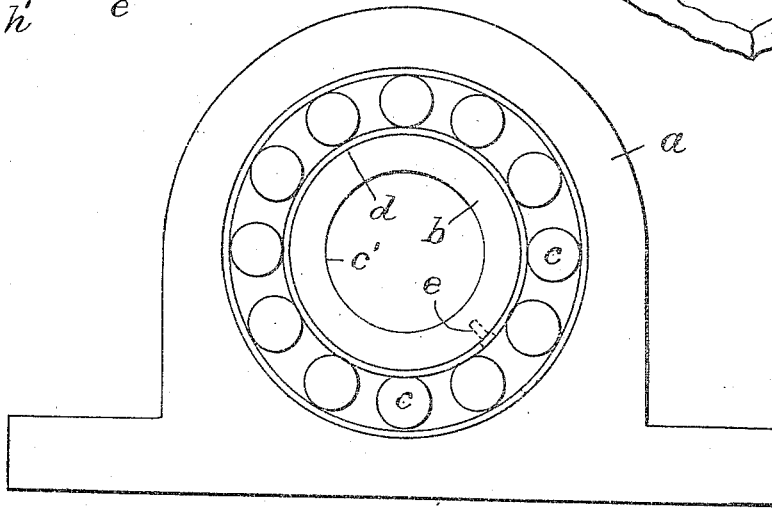
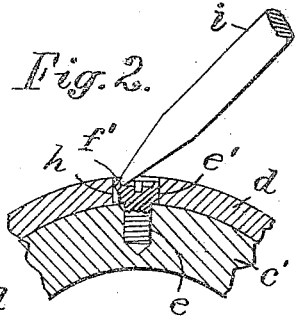
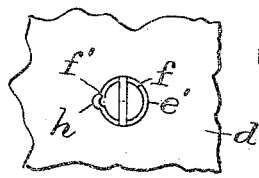
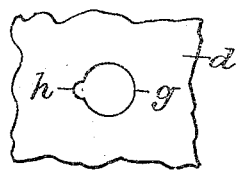
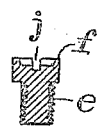
Inventor.
Charles S. Lockwood,
per Thos. S. Crane, Atty.

UNITED STATES PATENT OFFICE.

CHARLES S. LOCKWOOD, OF NEWARK, NEW JERSEY, ASSIGNOR TO HYATT ROLLER BEARING DIVISION, UNITED MOTORS CORPORATION, OF HARRISON, NEW JERSEY, A CORPORATION OF NEW YORK.

MEANS FOR LOCKING A SLEEVE UPON A HUB OR SHAFT.

1,282,604.         Specification of Letters Patent.         Patented Oct. 22, 1918.

Application filed July 11, 1918.   Serial No. 244,353.

*To all whom it may concern:*

Be it known that I, CHARLES S. LOCKWOOD, a citizen of the United States, residing at 496 Clinton avenue, Newark, county of Essex, and State of New Jersey, have invented certain new and useful Improvements in Means for Locking a Sleeve Upon a Hub or Shaft, fully described and represented in the following specification and the accompanying drawings, forming a part of the same.

The present invention relates to a means of fastening a sleeve to the parts which it protects within a roller-bearing.

Such sleeve is commonly made of steel and is oftened hardened and ground before its application in the bearing, and is used to provide a more durable wearing surface to a journal-bearing made of cast-iron, gun-metal, or other material softer than steel.

Such sleeves are often made to slide upon a shaft and secured to the same in any position where the roller bearing is to be applied; but a sliding fit is in such case required, to apply the sleeve to the shaft and slide it thereon to the desired location.

Such sleeves have been heretofore secured in position upon the shaft, or upon a hub to which they are applied, by a pin or screw which was liable to become dislodged, and cause great injury to the bearing by falling among the rapidly moving rolls.

Where a sleeve is applied to a hub a "driving-fit" can be employed, but it requires great care and skill to make the parts fit so snugly, and this can be avoided by the present invention, which furnishes a cheap and effective means of securing a sleeve upon a shaft or hub without the risk of any injury to the bearing.

The present invention consists in providing the sleeve with a perforation having a notch at one side and fitting a screw having a threaded body and flat head through such perforation into the contiguous part of the bearing, and crowding the edge of the screw-head laterally into the notch in the perforation.

To permit such a treatment of the screw-head, it is recessed upon the top to form a marginal ridge, which is readily bent adjacent to the notch by means of any pointed tool having strength enough to bend the material of the ridge into the notch.

Such engagement of the screw-head with the notch entirely prevents the screw from rotation or dislodgment from the threaded hole in which its body is inserted, and thus secures the sleeve in place without any danger of the screw being dislodged.

The operation of the invention will be understood by reference to the annexed drawing, in which Figure 1 is an end-view of a roller-bearing with the end of the casing omitted to expose the interior parts; Fig. 2 is a section of the hub and sleeve through the center of the locking-screw; Fig. 3 shows the interior of the sleeve adjacent to the perforation; Fig. 4 shows the head of the screw in plan somewhat enlarged above the scale of the other figures; Fig. 5 is a longitudinal section of the screw; Fig. 6 shows a portion of the sleeve with the screw-head engaged with the notch; as illustrated in Fig. 2; Fig. 7 is a cross section of the sleeve at the perforation, with the notch confined to its outer part; Fig. 8 is a perspective view of the same parts.

Figs. 2 to 8 inclusive are drawn upon a much larger scale than Fig. 1.

A roller-bearing is shown in Fig. 1 with casing $a$, hub $b$, rolls $c$, and shaft $c'$ within the hub.

The hub is encircled by a sleeve $d$ upon which the rolls run in their movement within the bearing, and the load whether applied to the shaft or to the casing crowds the rolls heavily against the sleeve $d$, and tends to stretch and loosen it.

A screw $e$ is shown inserted through the sleeve into the material of the hub, and its head inclosed in the perforation through the sleeve.

The special characteristics of the perforation and the screw-head are illustrated in Figs. 2 to 5 inclusive, where the screw $e$ is shown with a flat or filister head $e'$, recessed upon the top to form a marginal ridge $f$.

A portion of the sleeve $d$ is shown in Fig. 3 with the perforation $g'$ extended through the same and a notch $h$ formed by a slot at one side of the perforation. The screw is shown with the usual transverse kerf $j$ in the outer side of the head by which it is turned into its working position with a screwdriver.

The screw-head, as shown in Fig. 6, fits the perforation and its marginal ridge lies against the notch $h$, and such ridge can be bent into the notch by means of a pointed tool $i$ shown in Fig. 2 set within the recess and forced laterally against the ridge $f$ with the effect of bending a portion of it into the notch, as shown in Fig. 6. This has the same effect as the application of a key to a wheel upon a shaft, preventing the screw from turning and thus securing it permanently in its place.

In Figs. 2 and 3, the notch $h$ is shown extended entirely through the thickness of the sleeve at one side of the perforation $g$, and the head of the screw is proportioned to lie entirely within the perforation so as not to interfere with the movement of the rolls over the sleeve.

As only the outer edge of the head is bent into the notch, it is not essential that the notch should extend all the way through the sleeve, and a beveled notch $h'$ is shown in Figs. 7 and 8, which serves substantially the same purpose as the slot extended through the thickness of the sleeve, as shown in Fig. 2.

A cylindrical head is shown with flat shoulder where it joins the body of the screw, but the shape of the head is immaterial provided it is recessed upon the top to form an annular ridge which may be bent, next to the notch $h$ or $h'$, so as to engage the same as desired.

The casing $a$ is shown as a pedestal or pillow-block, but the invention is applicable to the motor-bearings, hanger-bearings, &c., or to any shaft or hub which is provided with a sleeve when the rolls bear thereon.

Having thus set forth the nature of the invention what is claimed herein is:

1. The means of securing a sleeve within a roller-bearing, which consists of a screw having the top of its head recessed to form a marginal ridge, and the sleeve having a perforation adapted to admit the said head and a marginal notch into which the ridge may be bent.

2. In a roller-bearing, the combination of a sleeve having a perforation extended through the thickness of the same and provided with a marginal notch, with a screw extended through the perforation into the contiguous part of the bearing and having one edge of its head forced into the said notch.

3. In a roller-bearing, the combination, with a hub and a sleeve thereon to sustain the rolls and provided with a perforation having a notch in one side, of a screw inserted through the sleeve into the hub and having a flat head recessed upon the top to form a marginal ridge, and the ridge bent into the notch when fitted within the perforation of the sleeve.

In testimony whereof I have hereunto set my hand.

CHARLES S. LOCKWOOD.

Copies of this patent may be obtained for five cents each, by addressing the "Commissioner of Patents, Washington, D. C."